(12) United States Patent
Dulaney

(10) Patent No.: US 6,486,434 B2
(45) Date of Patent: Nov. 26, 2002

(54) MULTIPLE BEAM TIME SHARING FOR A LASER SHOCK PEENING APPARATUS

(75) Inventor: Jeff L. Dulaney, Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/911,237

(22) Filed: Jul. 23, 2001

(65) Prior Publication Data

US 2001/0042738 A1 Nov. 22, 2001

Related U.S. Application Data

(62) Division of application No. 09/421,428, filed on Oct. 19, 1999, now Pat. No. 6,291,794.

(51) Int. Cl.[7] .............................................. B23K 26/00
(52) U.S. Cl. ................................................. 219/121.77
(58) Field of Search ...................... 219/121.6, 121.77, 219/121.68, 121.69, 121.76

(56) References Cited

U.S. PATENT DOCUMENTS 4,992,890 A  2/1991 Pinard et al.
5,730,811 A * 3/1998 Azad et al. ............. 219/121.61
6,127,649 A * 10/2000 Toller et al. ........... 219/121.86
6,144,483 A  11/2000 Allen et al.
6,197,133 B1 * 3/2001 Unternahrer et al. .. 219/121.61
6,285,002 B1  9/2001 Ngoi et al.

\* cited by examiner

Primary Examiner—Samuel M. Heinrich
(74) Attorney, Agent, or Firm—Randall J. Knuth

(57) ABSTRACT

A multiple laser peening cell apparatus for receiving pulses of energy from a laser shock peening device is comprised of a first cell for receiving a first pulse of energy, a second cell for receiving a second pulse of energy, and a beam distribution means, for directing the first pulse of energy and the second pulse of energy. Also, a method of directing pulses of energy originating from a single source to multiple workpieces comprises the steps of creating a first pulse of energy, directing the first pulse of energy to a first workpiece located in a first laser peening cell, creating a second pulse of energy, and directing the second pulse of energy to a second workpiece located in a second laser peening cell.

3 Claims, 5 Drawing Sheets

MULTIPLE BEAM TIME SHARING FOR A LASER SHOCK PEENING APPARATUS

This is a divisional of patent application Ser. No. 09/421,428 filed on Oct. 19, 1999 now U.S. Pat. No. 6,291,794, the disclosure of which is herein explicitly incorporated by reference.

BACKGROUND OF THE INVENTION

1. Field of the Invention

The present invention relates to a laser shock peening apparatus, and more particularly, to a method and apparatus for utilizing a multiple beam dispenser in a plurality of laser peening cells.

2. Description of the Related Art

Laser shock peening is a process for improving the fatigue, hardness, and corrosion resistance properties of materials by focusing radiation on preselected surface areas of a workpiece. Laser shock peening the workpiece can avoid gross deformation, cracking, and spallation of the workpiece, and nonplanar workpieces can be laser shock processed without the need of elaborate and costly shock focusing schemes.

Laser peening, or also referred to as laser shock processing and laser shock peening, typically utilizes two overlays: a transparent overlay (usually water) and an opaque overlay, typically an oil based, acrylic based, or water based, black paint. During processing, a laser beam is directed to pass through the water overlay and is absorbed by the black paint, causing a rapid plasma formation and vaporization of the paint surface and the generation of a high amplitude shock wave. The shock wave cold works the surface of the workpiece and creates compressive residual stresses, which provide an increase in fatigue properties of the part. When using a water-based paint, a high-speed water jet quickly removes any remaining paint on the workpiece, and the workpiece surface is subsequently dried by the use of a high-pressure fluid or gas jet.

Finally, the workpiece is repositioned for further processing. A workpiece is processed by producing a matrix of overlapping spots that cover the fatigue critical zone of the part.

The entire laser-peening process occurs inside a peening cell, wherein a part manipulator positions the workpiece. Laser systems used for laser peening are typically interfaced to a single laser peening cell. Consequently, there are limits to the types of workpieces that can be laser peened with single-peening-cell configurations. Additionally, the laser system cannot be utilized during initial workpiece set-up and alignment, which results in significant loss of productivity and higher laser peening costs.

SUMMARY OF THE INVENTION

Having the foregoing in mind, it is a primary object of this invention to fully use the available laser time by dividing operational time into multiple peening cells. The utilization of multiple peening cells allows for two cells to be used at once, or for set-up and alignment or cell maintenance to be conducted in one cell while a second or alternative cell is used for peening and production. Furthermore, the invention allows for the construction of a variety of differently sized peening cells for treatment of various workpieces without necessitating additional laser systems.

The present invention is directed to a method and apparatus for utilizing multiple processing cells. The preferred embodiment of the invention comprises a multiple-beam laser for utilization in laser shock processing applications, and consists of multiple peening cells that better utilize the potential of the laser. In the invention, a plurality of peening cells share the operating time of a set of laser beams.

In one embodiment of the present invention, the peening cells vary in size, thereby providing for a small part manipulator in a first cell, and a larger part manipulator in a second cell. This embodiment would be useful in an application where target workpieces vary greatly in size, and the utilization of a smaller cell would be impossible, while the utilization of a larger cell for both large and small applications would be inefficient. A multiple-beam laser directed at a plurality of varying sized laser peening cells could be constructed to have, for example, two laser beams in a first cell, and two laser beams in a second cell. When additional beams are needed in one of the cells, mirrors could temporarily divert beams from another cell.

In another embodiment of the present invention, a multiple laser beam system could be directed into a first peening cell, and redirected to a second peening cell upon an operator's command, either by physically moving the entire laser, or by utilizing a system of mirrors.

Yet another embodiment of the present invention further comprises a logic control device for controlling the usage of the varying peening cells, thereby optimizing the efficiency of the laser system.

The invention can also be expressed in the form of a method, wherein a first pulse of energy is created, the first pulse of energy is directed into a first peening cell, a second pulse of energy is created, the second pulse of energy is directed into a second peening cell, and the process repeats itself as determined by a job-sensing microprocessor.

An advantage of the present invention is that each pulse of the laser energy can be utilized. In the present laser peening systems, many laser pulses cannot be utilized because the workpiece is not available to be processed.

The system, in another embodiment of the invention, allows for utilization of each potential laser pulse, i.e., flashlamp pump pulse (or diode pumping pulse for diode pumped systems) through time sharing.

Another advantage of the present invention is that more workpieces can be produced in a given amount of operation time.

Yet another advantage of the present invention is that with use of multiple peening cells, it is possible that while one cell is down for repair or for setting up a new workpiece, the laser can continue to process other parts in the other peening cells. This way the laser is in continuous use, maximizing its use and minimizing wasted flashlamp pulses.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
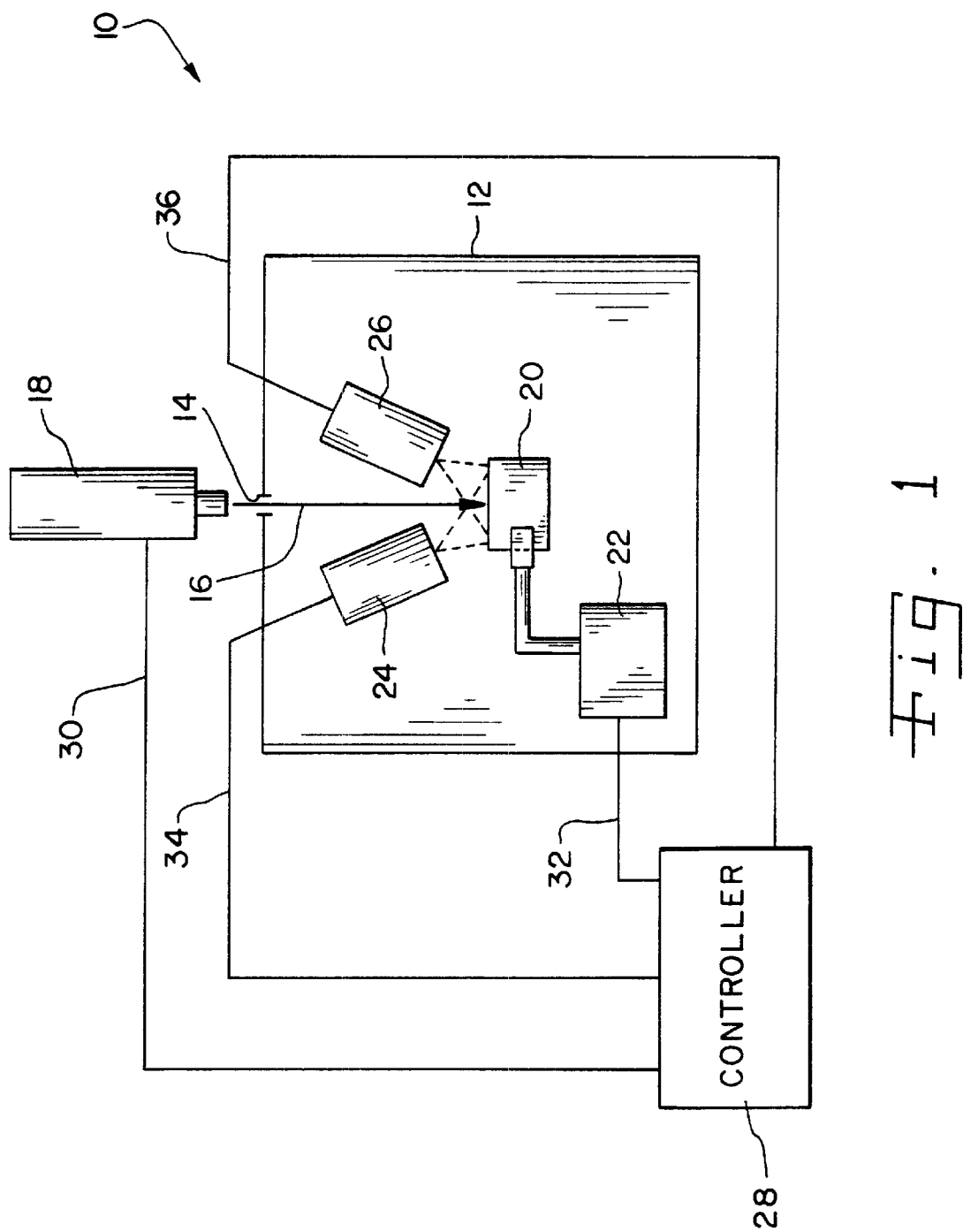
FIG. 1 is a diagrammatic view of one embodiment of a laser shock peening system.

The present invention could be implemented to utilize each potential laser pulse, i.e., flashlamp pump pulse (or diode pumping pulse for diode pumped systems) through timesharing. Because of the requirement for maintaining a constant thermal load on the laser gain media, flashlamps or other pumping source must run at a near constant repetition rate. If the workpiece is not ready to be laser peened or to receive a laser pulse, the laser shutters in the system do not open and a potential pulse is un-utilized. These un-utilized pulses still take away from the lifetime of flashlamps and associated electronics. Each flashlamp flash uses and degrades the lifespan of the flashlamps, pulse forming networks, and associated charge and power supplies. These underutilized or wasted shots add to the maintenance costs and add time (through inefficiency) to the overall processing time for laser peening a workpiece. The advantages of the present system, not only eliminates wasted time between laser shots, but increases the ability to use all of the potential laser pulses created within the laser system.

An additional aspect of the invention is that as the repetition rate increases in the laser peening systems, it may not be possible for the transparent overlay (water overlay) to recover, or for other activity to occur, such as the manipulator arms moving the workpiece to the new location, the workpiece may not be switched out or changed, or the RapidCoater™ painting system may not be able to cycle, or other process data may not be collected or analyzed. In such case, there may be insufficient time to utilize the full repetition rate of the laser, so that it may be beneficial to cycle the laser beams into two or more laser peening cells. This may be accomplished by using rapidly moving mirrors, rapidly rotating beam steering optics, such as optical wedges, or possibly an electro-optical or acoustical-optical device to steer the laser beam between mirrors.

Alternatively, instead of cycling between cells (e.g., particular pulses put into particular laser peening cells in order) it may be easier to send all of the pulses from one beam to one cell and all of the pulses from a second beam to a second cell. This particular embodiment may effectively reduce the repetition rate for a cell in half (for a two beam system), but allows processing of two parts at one time, which doubles or at least increases the throughput.

A further embodiment of the present invention, which can be particularly useful for laser peening systems with repetition rates less than about one-half Hertz (one laser-peening pulse every two seconds), is to direct all of the laser pulses into one peening cell to process an entire pat or series of parts and then direct all of the pulses into a second peening cell to process an entire part or a series of parts. This alternating approach would be useful for laser peening systems that do not utilize a full parts-handling system, because the operator will be able to manually load a workpiece or collection of workpiece in the second peening cell, while processing is continuing in the first peening cell. This embodiment does not require rapid switching of laser energy between cells during processing, but does provide the significant benefits of saving overall processing time and reducing maintenance costs.

This alternating approach becomes even more important when setting up to process a new part, i.e., one that has not been previously processed with the laser peening system. In typical laser-peening configurations, the laser can not be utilized during setup, because the part is not ready to be processed. The present invention allows one peening cell to be utilized to process workpieces while the other peening cell is being prepared. When alternating between processing entire series of workpieces located in different peening cells, one cell may receive all of the laser pulses for several hours or more. In this case, it is possible for the operator to switch the laser pulses from one cell to another manually, via mirrors or optical switches, rather than through the use of a computer.

Laser shock processing is an effective method of increasing fatigue life in metals by treating fatigue critical regions. The effects of laser shock processing on fatigue of welded specimens has been studied in great detail in "Shock Waves and High Strained Rate Phenomena in Metals" by A. H. Clauer, J. H. Holbrook and B. P. Fairand, Ed. by M. S. Meyers and L. E. Murr, Plenum Press, New York (1981), PP. 675–702.

For more thorough background in the prior history of laser shock processing and that of high power processing of engineered materials, reference can be made to U.S. Pat. Nos. 5,131,957 and 5,741,559, these patents explicitly hereby incorporated by reference.

Referring now to FIG. 1, a typical laser shock processing apparatus 10 comprises a laser peening cell 12 with an opening 14 for a laser beam 16 created by laser 18, a source of coherent energy. Laser 18, by way of example, may be a commercially available high power pulse laser system capable of delivering more than approximately 10 joules in less than 100 nanoseconds. The laser pulse length and focus of the laser beam may be adjusted as known in the art, and it is common for a plurality of laser beams to be emitted simultaneously.

As shown in FIG. 1, a workpiece 20 is held in position within peening cell 12 by means of a part manipulator 22. Apparatus 10 includes a material applicator 24 for applying an energy absorbing material onto workpiece 20 to create a "coated" portion. Material applicator 24 may be that of a solenoid operated painting station or other construction such as a jet spray or aerosol unit to provide a small coated area on workpiece 20. Apparatus 10 further includes a transparent overlay applicator 26 that applies a fluid or liquid transparent overlay to workpiece 10 over the portion coated by material applicator 24. Transparent overlay material should be substantially transparent to the radiation, water being the preferred overlay material. Additionally, the applicators may apply either an absorbing or transparent tape.

Figure 2:
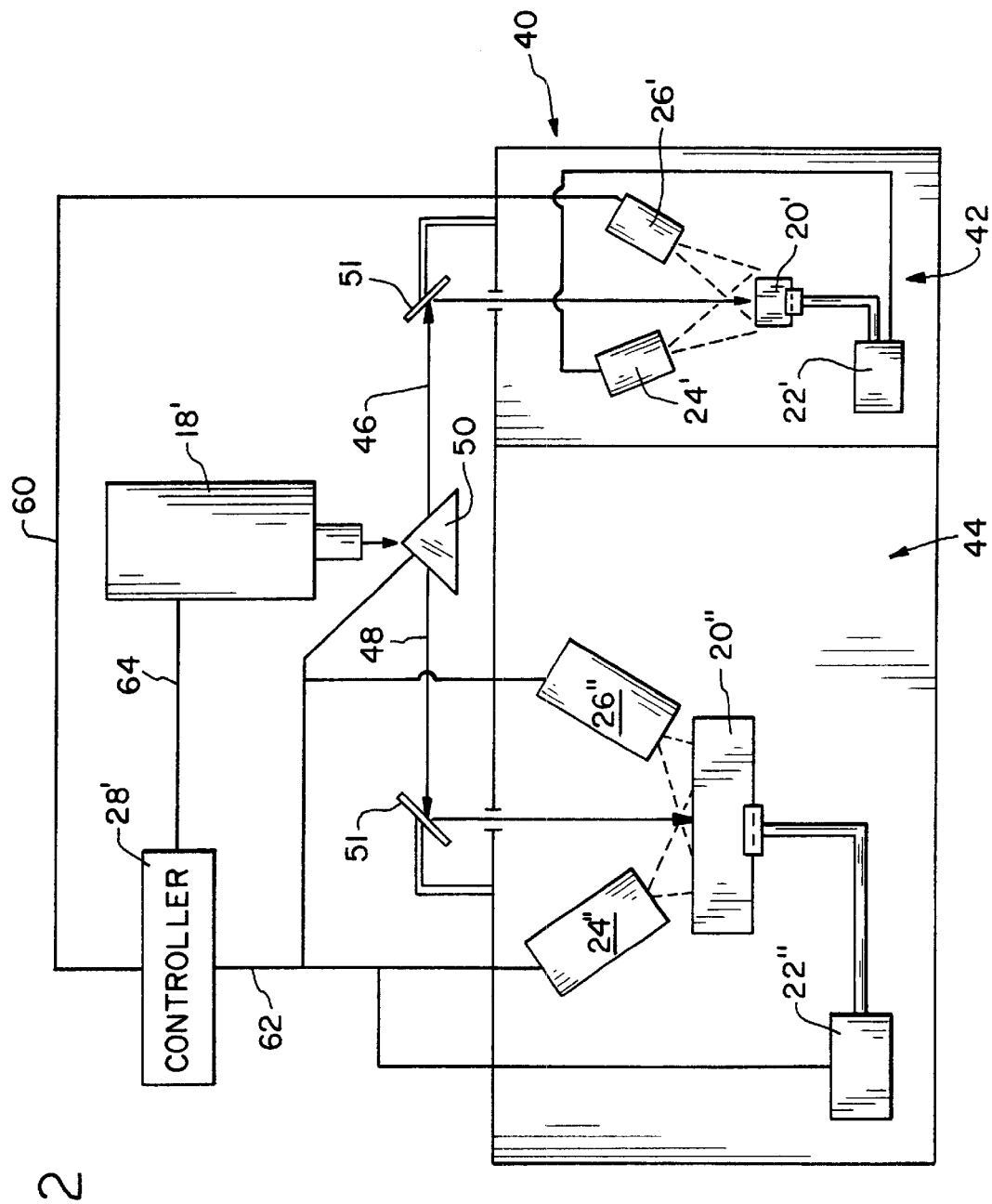
FIG. 2 is a diagrammatic view of the laser shock peening device of FIG. 1, incorporated with a multiple-beam, time-sharing apparatus of the present invention.

Referring now to FIG. 2, a preferred embodiment of the present invention consists of a multiple laser peening cell apparatus 40 for receiving pulses of energy from laser source 18', laser peening cell apparatus 40 containing at least two cells, first cell 42 for receiving a first pulse of energy, and second cell 44 for receiving a second pulse of energy. First pulse of energy 46 consists of at least one laser beam, and originates from a laser source 18', having a pulse width less than 100 nanoseconds and energy greater than 10 joules per pulse. Second pulse of energy 48 also consists of at least one laser beam, and originates from laser source 18', having a pulse width less than 100 nanoseconds and energy greater than 10 joules per pulse. Once a laser pulse (having preferably two or more beams) is emitted from laser source 18', a beam distribution means 50 can split and/or direct the first pulse of energy 46 and the second pulse of energy 48 in the desired directions. Mirrors 51 serve to further direct first pulse 46 and second pulse 48 to workpieces 20', 22", held by part manipulators 22', 22", respectively.

Material applicators 24', 24" may be that of a solenoid operated painting station or other construction such as a jet spray or aerosol unit to provide a small coated area on workpieces 20', 20". Peening cell apparatus 40 further includes transparent overlay applicators 26', 26" that apply a fluid or liquid transparent overlay to workpieces 20', 20" over the portion coated by material applicators 24', 24". In the invention, processes and components such as laser source 18', part manipulators 22', 22", material applicators 24', 24", transparent overlay applicators 26', 26", and beam distribution means 50 are operatively controlled by controller 28' via control lines 60, 62, 64. Controller 28' is preferably a personal computer or microprocessor, but can be any type of control device capable of performing the functions as outlined below.

Figure 3:
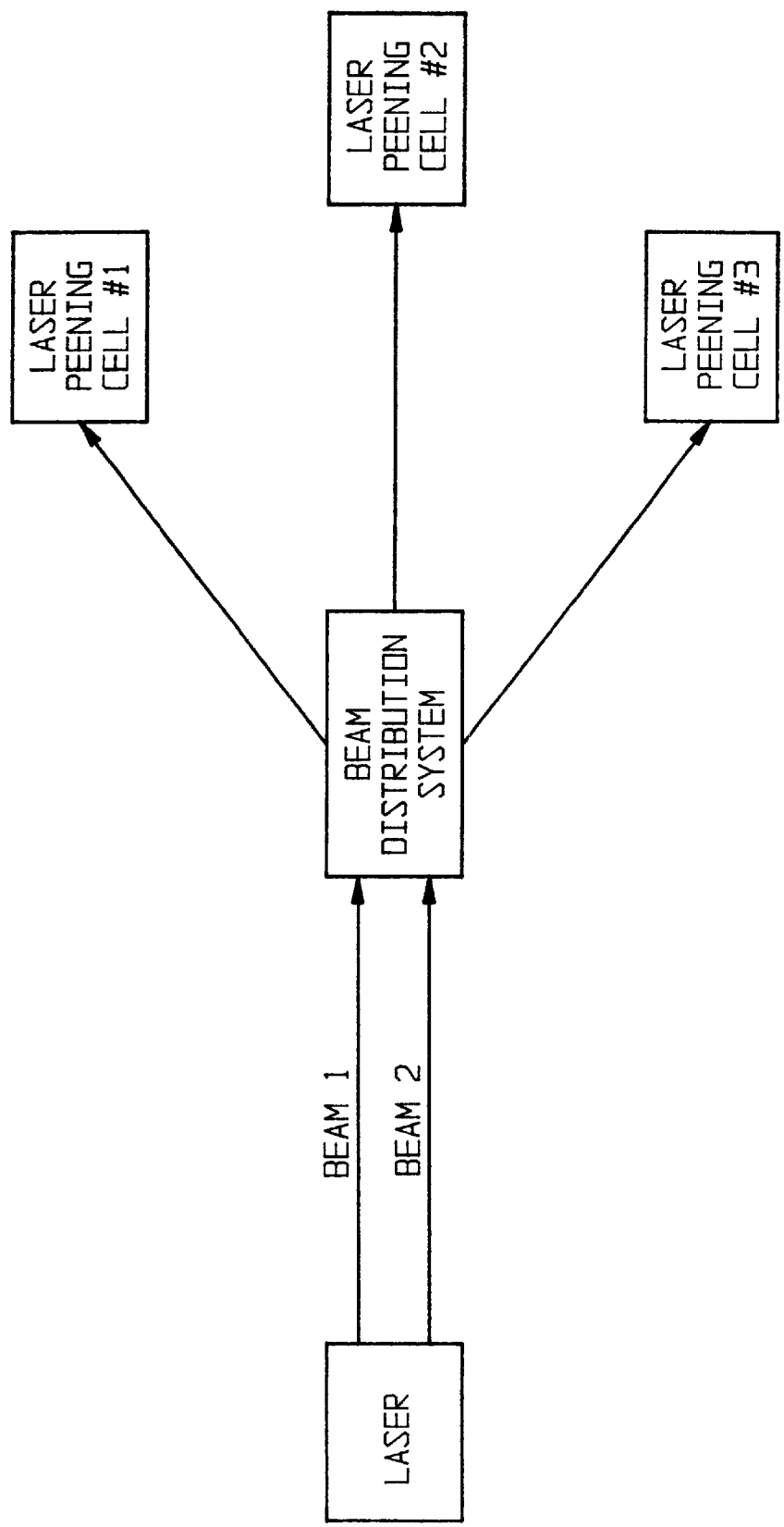
FIG. 3 is a diagrammatic view of one form of the present invention.

The beam distribution means, in one case, may direct all four beams into one cell and subsequently direct all four beams into another laser peening cell. In other cases, a pulse of laser energy, with multiple beams, may be split by the beam distribution means, such that at least one beam is directed into a different cell than another beam from the same pulse. FIG. 3 depicts one embodiment of the invention with a laser creating two beams (#1 and #2) which are communicated to the beam distribution system for eventual communication to selected laser peening cells.

The laser peening process generates enormous amounts of data for each laser shot, which can include local area network (LAN) status and parameters of the laser oscillator, laser amplifiers, beam distribution system, overlay applicators, part manipulator, laser beams, process diagnostics, and workpiece data. Data acquisition and analysis for the multiple peening cells operating from one laser source of the present invention may be accomplished in several ways.

First, there may be a single control system (not necessarily a single computer or microprocessor) where all data from the peening cells is fed to this central location for processing and storage.

Figure 4:
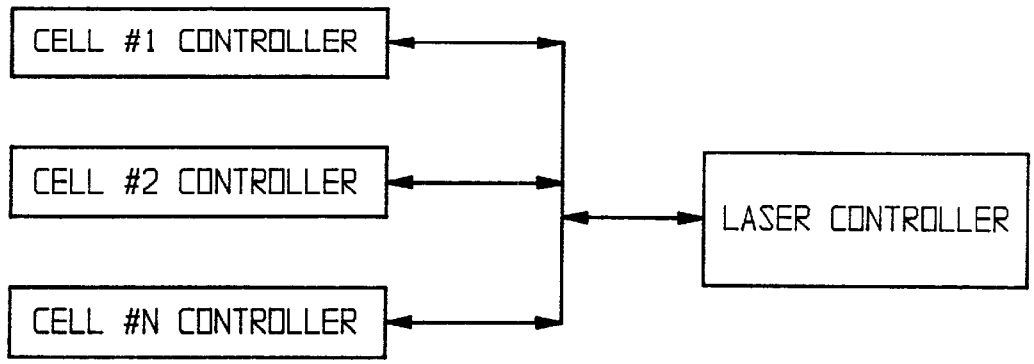
FIG. 4 is a diagrammatic view of the laser peening control system.

A second method could be to distribute the acquisition and processing of data to control systems linked to the laser control system. In this case, the laser control system would be responsible for laser activity and monitoring while the cell control system would have the responsibility for proper part placement and process success confirmation, among other monitored parameters. The laser controller would deliver pertinent metrics and data to the cell control system for evaluation and storage (FIG. 4). Such a system would utilize LAN or WAN type communication schemes known in the art.

Figure 5:
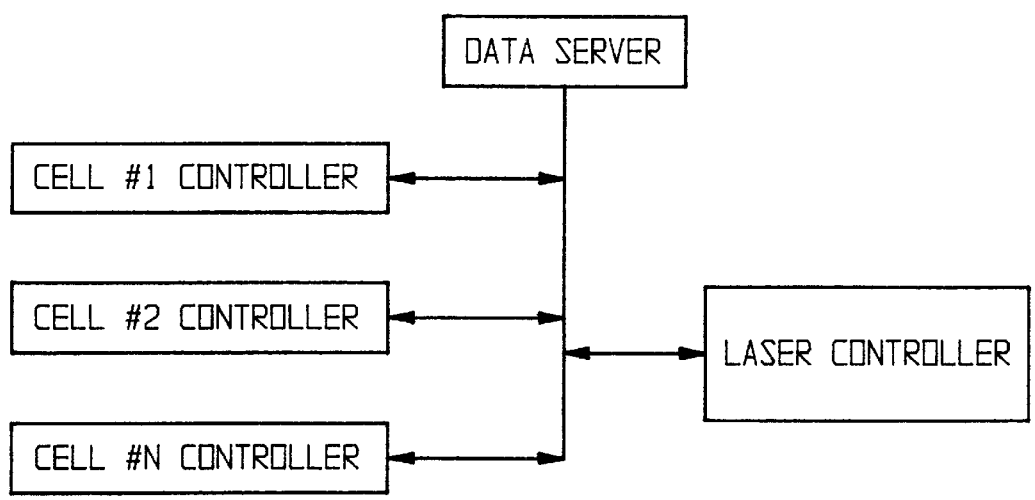
FIG. 5 is a diagrammatic view of one form of the reporting and data maintenance subsystems of the present invention.

A third method for multiple peening cell implementation is a combination of the first two methods above as shown in FIG. 5. In this system, both the laser control system and the cell control systems are linked to a main control and data server system. In this scenario, both control systems report laser peening and laser status data to the data server for storage. Control of the individual systems is still maintained by each control system but overall reporting and data maintenance is the responsibility of the data server system.

The invention can also be expressed as a method of directing pulses of energy originating from a single laser source 18' to target workpieces 20', 20", comprising the steps of creating a first pulse of energy 46, typically having a pulse width less than 100 nanoseconds and energy greater than 10 joules per pulse, directing the first pulse of energy 46 to a first workpiece 20' located in a first peening cell 42, creating a second pulse of energy 48, typically having a pulse width less than 100 nanoseconds and energy greater than 10 joules per pulse, and directing the second pulse of energy 48 to a second workpiece 20" located in a second peening cell 44.

The present invention operates substantially as follows. Workpieces 20', 20", which can advantageously be of differing sizes, are brought into laser peening cells 42, 44 and secured to part manipulators 22', 22". Peening cells 42, 44 are preferably of differing sizes to more efficiently accommodate larger and smaller workpieces, but peening cells 42, 44 can be identical in size if the application so dictates. While the preferred embodiment provides for two peening cells 42, 44, it should be noted that any number of peening cells are anticipated by the invention, as would be required by the particular application.

Controller 28' operatively signals material applicators 24', 24" and transparent overlay applicators 26', 26" via control lines 60, 62 to coat workpieces 20', 20". Laser source 18' is subsequently commanded to fire by controller 28' via control line 64, such that a laser pulse with at least one laser beam is emitted and directed into beam distribution means 50. While the preferred embodiment comprises four beams and directs two beams toward each workpiece, it is anticipated that as few as one beam and as many as physically practical may be used and generated. As described in more detail below, alternative embodiments can allow for variations in the number of beams with each pulse of energy.

Beam distribution means 50 is controlled by controller 28', and operates to selectively direct a first pulse of energy 46 toward workpiece 20', causing a shock wave in workpiece 20', and creating the desired enhanced physical properties in the workpiece 20' at the impact site. Depending on the overlay material used, workpiece 20' may need to be cleared of leftover coatings, which is typically accomplished by a high speed jet of liquid emitted from transparent material overlay applicator 26' in the preferred embodiment of the invention. Workpiece 20' may subsequently need to be dried of all fluids, which can be accomplished by a similar type of material applicator that blows a stream of compressed fluid, gas, or air onto workpiece 20'. Finally, workpiece 20' is repositioned to receive further energy pulses. At all times, controller 28' operatively controls laser source 18', beam distribution means 50, mirrors 51, material applicators 24', 24", transparent overlay applicators 26', 26", and part manipulators 22', 22". In one embodiment, controller 28' is a programmable microprocessor, and can be programmed to respond to operator instructions as well as pre-programmed instructions. Controller 28' can also be programmed to receive data from an operator or an indicator regarding the number of workpieces awaiting processing in each cell. The controller 28' would then compute the most efficient manner of processing the awaiting workpieces, and direct energy pulses 46, 48 in the corresponding directions.

According to prior art, laser source 181 would normally be inactive while workpiece 20' is cleaned, dried, and repositioned. However, according to the present invention, laser source 18' is advantageously directed to emit a second pulse of energy 48 toward workpiece 20" in peening cell 44 while it would have otherwise been inactive. Thereafter, workpiece 20" may undergo the cleaning, drying, and repositioning process as the process repeats itself. By utilizing the laser pulse that would not be used, the present invention greatly improves the productivity of apparatus 40.

In an alternative embodiment, beam distribution means 50 can work in conjunction with mirrors 51 and controller 28' to direct more than the allotted number of laser beams to a particular peening cell.

Figure 6:
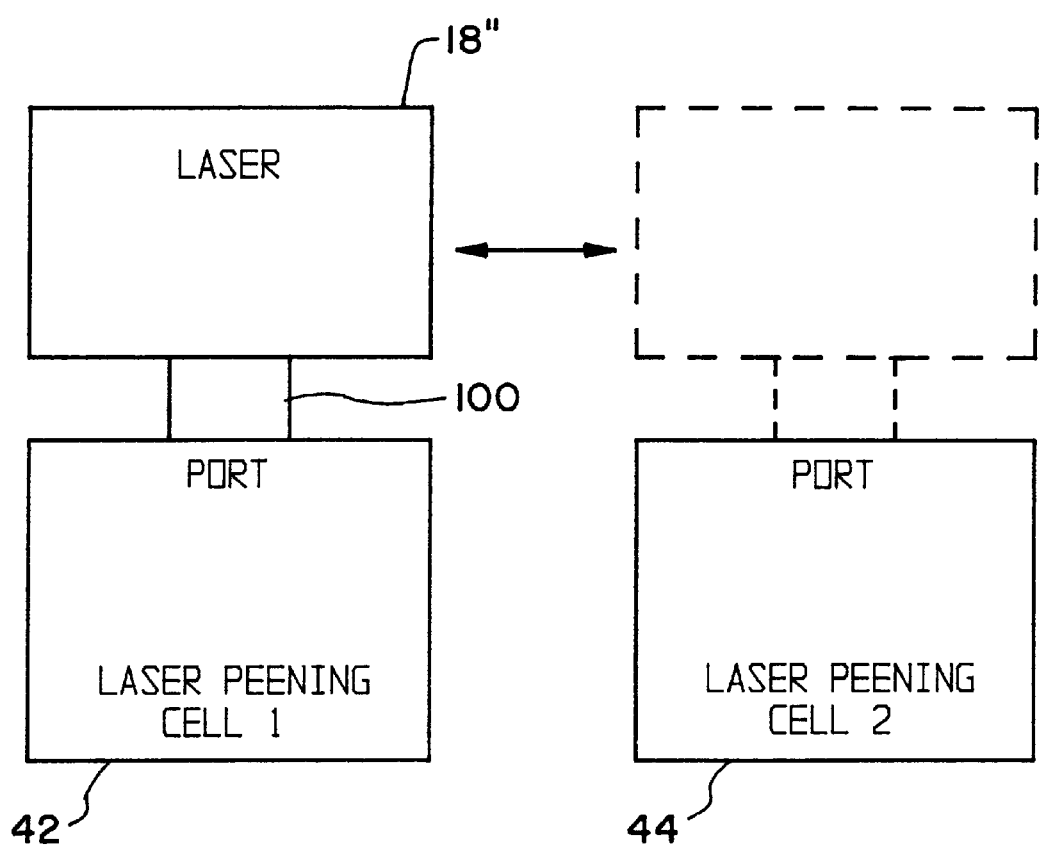
FIG. 6 is a diagrammatic view of one form of a mobile laser system for utilization with multiple laser peening cells.

In another embodiment of the invention (as shown in FIG. 6), laser source 18" can be repositioned with respect to peening cells 42, 44, instead of having beam distribution means 50 directing the energy pulses 46, 48 to the respective peening cells 42, 44. In this embodiment, beam distribution means 50 is not included in the invention, and controller 28' controls the relative position of laser source 18" such that mirrors 51 are also unnecessary because laser source 18" is positioned to send laser pulses directly into a peening cell 42, 44—one at a time.

With regards to the mobile laser 18" with multiple peening cells, the best method for locking the laser into the peening cell port, is a heavy-duty mechanical connection 100 that would tightly pull-up and lock the two halves (laser source 18" and peening cell 42 or 44) together. Alignment is established initially by a manual (or potentially automated) alignment as part of the initial set-up and alignment. When the laser system is returned to the peening cell for subsequent processing of identical parts, alignment would probably need to be checked and possibly adjusted before processing could begin. Possible alignment checks could include processing a test workpiece and using an imaging system similar to that described in U.S. patent application Ser. No. 09/057,107, the disclosure assigned to the assignee of the present invention and explicitly incorporated herein by reference, to make final alignments prior to processing.

Another way to confirm alignment may be by establishing an optical alignment between the two halves that utilizes an alignment laser co-aligned with and through a portion or port of the laser system so that the alignment laser (at a much lower energy and probably continuous diode type laser (CW)) places a spot on some alignment target (or on the workpiece). Then either automatic feedback or manual adjustment of one or more mirrors/reflectors (per beam) could be used to adjust the system into a final alignment.

Another alignment method may include establishing an optical alignment between the two halves that utilizes an alignment laser that is not co-aligned with any part of the laser beam path, but with reflectors rigidly attached within each half of the system (the first half being the laser source 18", the second half being one of the laser peening cells). The alignment beam may be reflected around and between the two halves in any convenient path, but the longer the path, the more accurate the alignment would be. There would be a alignment laser source, a multiplicity of reflectors, and a detector (e.g., a photo detector, photo diode array, camera, or other similar device) located at the end of the beam path. Then, either automatic feedback or manual adjustment of at least one of the two halves could be used to correct the physical placement for final alignment. Note that this approach requires relative movement between the two halves, which movement may be effectuated by hydraulics, tram, rail, crane, or other means of driven movement.

The above embodiments also have the advantage of being able to align the beam delivery system in the peening cell "offline" using an alignment laser. The diagnostics of the peening cell may be then tested offline. This approach saves valuable laser source time by not utilizing the laser source 18" during the initial alignment to the part, programming of the parts manipulator, and possibly some of the laser cell 42, 44 diagnostic and check-out functions.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multiple laser peening cell apparatus for receiving pulses of energy from a laser shock peening device, said apparatus comprising:

a movable laser source;

a first cell for receiving a first pulse of energy, said first pulse of energy originating from a moveable laser source;

a second cell for receiving a second pulse of energy, said second pulse of energy originating from said moveable laser; and movement means for moving said moveable laser source between said first cell and said second cell.

2. The apparatus of claim 1 further including:

an alignment means for aligning and connecting said moveable laser source to a said laser cell.

3. The apparatus of claim 2 in which said alignment means comprises a continuous output laser.

* * * * *